(12) United States Patent
Bae et al.

(10) Patent No.: US 11,920,707 B2
(45) Date of Patent: Mar. 5, 2024

(54) SEALED SLEEVE

(71) Applicants: HANATECH CO., LTD., Gimpo-si (KR); AIM TECH CO., LTD., Uiwang-si (KR)

(72) Inventors: Chang Hwan Bae, Seoul (KR); Hyo Sang Lee, Gyeonggi-do (KR)

(73) Assignees: HANATECH CO., LTD., Gimpo-si (KR); AIM TECH CO., LTD., Uiwang-si (KR)

( * ) Notice: Subject to any disclaimer, the term of this patent is extended or adjusted under 35 U.S.C. 154(b) by 0 days.

(21) Appl. No.: 17/304,095

(22) Filed: Jun. 14, 2021

(65) Prior Publication Data
US 2021/0372546 A1 Dec. 2, 2021

Related U.S. Application Data

(63) Continuation of application No. 15/547,797, filed as application No. PCT/KR2017/001345 on Feb. 7, 2017, now abandoned.

(30) Foreign Application Priority Data

Apr. 14, 2016 (KR) .................. 10-2016-0045697

(51) Int. Cl.
*F16L 25/14* (2006.01)
*F16L 13/14* (2006.01)
(Continued)

(52) U.S. Cl.
CPC ............ *F16L 25/14* (2013.01); *F16L 13/146* (2013.01); *F16L 21/00* (2013.01); *F16L 33/225* (2013.01); *F16L 55/00* (2013.01)

(58) Field of Classification Search
CPC . F16L 37/02; F16L 47/04; F16L 19/08; F16L 33/22; F16L 55/00; F16L 33/225;
(Continued)

(56) References Cited

U.S. PATENT DOCUMENTS

| 3,149,860 A | 9/1964 | Hallesy |
| 3,498,648 A | 3/1970 | Hallesy |

(Continued)

FOREIGN PATENT DOCUMENTS

| JP | 06-249374 | 9/1994 |
| KR | 10-0169105 B1 | 9/1991 |

(Continued)

OTHER PUBLICATIONS

International Search Report received for PCT Patent Application No. PCT/KR2017/001345 dated Apr. 19, 2017in 3 pages.

(Continued)

*Primary Examiner* — William S. Choi
(74) *Attorney, Agent, or Firm* — Knobbe, Martens, Olson & Bear, LLP

(57) ABSTRACT

A sealed sleeve installed at an insertion coupling portion in a state in which a first pipe and a second pipe are insertion coupled to each other in order to seal couple the first pipe having a first outer diameter and a first inner diameter and the second pipe having a second outer diameter and a second inner diameter larger than the first outer diameter includes: a pillar shaped-main body having a main body central shaft; a through-hole formed using the main body central shaft as a central shaft on the main body and having an inlet as a second pipe side opening in an installation state and an outlet as a first pipe side opening in an installation state, wherein in the through-hole, a pressing portion that applies a sealing pressure to the insertion coupling portion is formed in a portion of an inner wall, and an inner diameter of the pressing portion is smaller than the second outer diameter.

22 Claims, 5 Drawing Sheets

(51) Int. Cl.
*F16L 21/00* (2006.01)
*F16L 33/22* (2006.01)
*F16L 55/00* (2006.01)

(58) Field of Classification Search
CPC ....... F16L 21/007; F16L 21/00; F16L 13/146; F16L 25/14; F16L 13/14
USPC ............ 285/343, 417, 369, 356, 339, 294.1, 285/145.4, 12
See application file for complete search history.

(56) References Cited

U.S. PATENT DOCUMENTS

| | | |
|---|---|---|
| 4,858,968 A | 8/1989 | Moebius |
| 4,911,484 A | 3/1990 | Hackforth |
| 5,174,611 A | 12/1992 | Byrd et al. |
| 5,346,262 A | 9/1994 | Liebig |
| 6,367,850 B1 | 4/2002 | Thrift et al. |
| 7,654,588 B2 | 2/2010 | Schwalm |
| 2008/0001404 A1 | 1/2008 | Nicholson |
| 2013/0106103 A1 | 5/2013 | Horsfall et al. |

FOREIGN PATENT DOCUMENTS

| | | |
|---|---|---|
| KR | 20-0413769 Y1 | 4/2006 |
| KR | 10-2006-0104013 A | 10/2006 |
| KR | 10-2014-0046616 A | 4/2014 |
| KR | 10-2015-0011791 A | 2/2015 |

OTHER PUBLICATIONS

Office Action dated Jun. 9, 2016 in Korean Patent Application No. 10-2016-0045697 in 15 pages.

SEALED SLEEVE

CROSS-REFERENCE TO RELATED APPLICATION

This application is a continuation of U.S. application Ser. No. 15/547,797, filed on Jul. 31, 2017 as the U.S. National Phase under 35 U.S.C. § 371 of International Application PCT/KR2017/001345, filed Feb. 7, 2017, which claims priority to Korean Patent Application No. 10-2016-0045697, filed on Apr. 14, 2016. The content of each of the above is hereby incorporated by reference in its entirety.

BACKGROUND OF THE INVENTION

Field of the Invention

The present invention relates to a sealed sleeve applied to home, industrial, commercial, vehicle-mounted air-conditioner systems and refrigeration/freezing system to which a refrigerant pipe is applied, and more particularly, to a sealed sleeve that enables a worker to easily recognize a direction by having a protruding portion at an outer circumferential surface and that can maximize a sealing performance by optimizing a length of a pressing portion and that can prevent a failure in a mounting process by forming a predetermined curved surface on a portion within a through-hole and that is easy for connection of pipes having different sizes.

Description of the Related Art

In home, industrial, commercial, and vehicle-mounted air-conditioner systems (air-conditioner) and home, industrial, and commercial refrigeration/freezing systems (refrigerator, freezer), a refrigerant that charges by a high pressure is used, and a pipe that forms a flow channel of such a refrigerant should strongly seal a connection joint, and a sealed sleeve as a part for such sealing connection is used.

In Korean Patent No. 20-0369210 (title of the invention: enhanced structure of sleeve for air-conditioner refrigerant pipe, hereinafter, referred to as conventional art 1), a sleeve for an air-conditioner refrigerant pipe in which a leading portion and a sleeve for a wall body are directly connected and in which an arc-shaped pipe and a sleeve for a balcony wall body are connected by a connection pipe and in which an extension pipe is extended between the other end of the arc-shaped pipe and the wall body sleeve, wherein in the wall body sleeve, a support bridge is integrally formed in a vertical portion of both sides, the wall body sleeve has an expanded pipe portion protruded to each outside, a pipe formed in an intermediate portion is dualized to have a variable length while being slid with inserted, a pipe positioned at the inside is inserted into an inner surface of a pipe positioned at the outside to have a variable length, both ends of the arc-shaped pipe are expanded and dualized to have a variable length while being slid with inserted, and at a vertical surface of the arc-shaped pipe positioned at the outside, a support bridge having a predetermined height in a lengthwise direction is integrally formed, both ends of the sleeve for a balcony wall body are torn by 45° and are inserted and slid with expanded to have a variable length, and at a vertical surface of the sleeve positioned at the outside, a support bridge having a predetermined height in a lengthwise direction thereof is integrally formed, a cap in which the protrusion end having a fixing hole at the outside is integrally formed is detachably inserted into expanded pipe portions of both ends.

SUMMARY OF THE INVENTION

Technical Problem

The present invention has been made in an effort to solve a first problem in which a time for an installation work is excessively taken, a second problem in which sealing and coupling are inconvenient in connecting pipes whose inner diameter and outer diameter are different, and a third problem in which it is difficult that a worker recognizes a direction of a sleeve.

The technical problems of the present invention are not limited to the above-described technical problems and the other technical problems will be understood by those skilled in the art from the following description.

Solution to the Problem

In accordance with an aspect of the present invention, a sealed sleeve installed at an insertion coupling portion in a state in which a first pipe and a second pipe are insertion coupled to each other in order to seal couple the first pipe having a first outer diameter and a first inner diameter and the second pipe having a second outer diameter and a second inner diameter larger than the first outer diameter includes: a pillar shaped-main body having a main body central shaft; a through-hole formed using the main body central shaft as a central shaft on the main body and having an inlet as a second pipe side opening in an installation state and an outlet as a first pipe side opening in an installation state, wherein in the through-hole, a pressing portion that applies a sealing pressure to the insertion coupling portion is formed in a portion of an inner wall, and an inner diameter of the pressing portion is smaller than the second outer diameter.

The pressing portion may be formed adjacent to the outlet.

The pressing portion may have the same inner diameter at an entire point from a pressing portion second boundary portion positioned at a corner of the outlet to a pressing portion first boundary portion existing at a predetermined position within the through-hole.

A length from the pressing portion first boundary portion to the pressing portion second boundary portion as a main body central shaft direction length of the pressing portion may be formed in a length of 20 to 40% of a central shaft direction length of the main body.

In a mounting process of the sealed sleeve, as the sealed sleeve is gradually further inserted into the second pipe side, in order to gradually increase a pressure in which the sealed sleeve applies to the second pipe, the through-hole may have a pressing introducing portion whose inner diameter gradually decreases over an area from the inlet to the pressing portion first boundary portion.

An inner wall of the through-hole forming the pressing introducing portion may be formed in a curved surface.

A sectional outer edge line of the pressing introducing portion by a flat surface including the main body central shaft may become a convex-shaped arc having a predetermined curvature radius.

The pressing portion may include a front end pressing portion and a rear end pressing portion, and an inner diameter of the front end pressing portion may be larger than an inner diameter of the rear end pressing portion.

The main body may have an identification structure that enable to identify directions of the inlet and the outlet by tactile sense.

The identification structure may be formed in an embossing structure relatively protruded from the main body outer surface or an engraving structure relatively depressed from the main body outer surface.

The embossing structure or the engraving structure may have a step of 0.2 to 2 mm from the main body outer surface.

A difference between an inner diameter of the pressing portion and the second outer diameter may be 5 to 15% of the second outer diameter.

A difference between the front end pressing portion inner diameter and the rear end pressing portion inner diameter may be 1 to 10% of the rear end pressing portion inner diameter.

In accordance with another aspect of the present invention, a method of using the sealed sleeve including steps of: inserting the sealed sleeve into a first pipe such that an inlet is adjacent to an insertion coupling portion; insertion coupling the first pipe to the second pipe with the sealed sleeve inserted; inserting an end portion of the second pipe into the inlet side of the sealed sleeve; enabling an end portion of the second pipe to arrive at the pressing portion first boundary portion, as the second pipe is inserted along a curved surface of the pressing introducing portion, by pressing a pressure to an end portion of the outlet side of the sealed sleeve; enabling the second pipe end portion to arrive at the pressing portion second boundary portion by pressing a pressure to the outlet side end portion of the sealed sleeve; and enabling sealing connection of the first pipe and the second pipe to be complete, as the pressing portion applies a sealing pressure to the insertion coupling portion.

Advantageous Effect(s) of the Invention

According to an exemplary embodiment of the present invention, a first effect that can originally solve a problem of refrigerant leakage and cross-section break by optimizing a length of a pressing portion, a second effect that can minimize a failure of cross-section break by optimizing a shape of a pressing introducing portion, which is a transition segment from an inlet to a pressing portion, a third effect that can reduce an error using a sleeve by erroneously determining a direction of the front and the rear thereof because a worker can easily recognize a direction of a sleeve through an identification structure, and a fourth effect that can quickly mount a sealed sleeve using a jig can be provided.

An effect of the present invention is not limited to the above-described effects and it should be understood that the effect includes an entire effect that may be deduced from a configuration of the invention described in a detailed description or claims of the present invention.

DERAILED DESCRIPTION OF THE PREFERRED EMBODIMENTS

Figure 1:
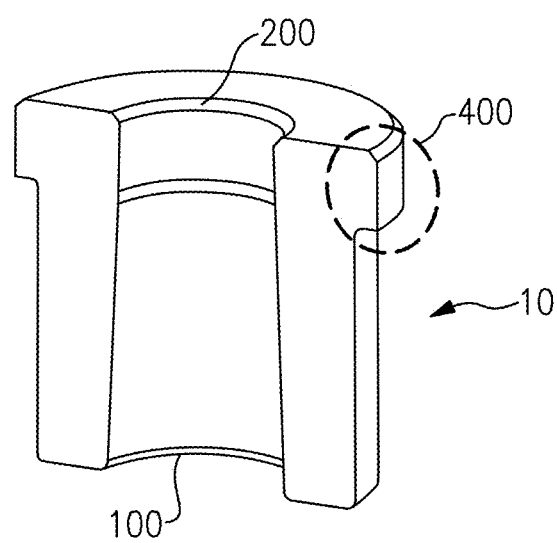
FIG. 1 is a schematic view illustrating a cross-section including a central shaft of a sealed sleeve according to an exemplary embodiment of the present invention.
Figure 2:
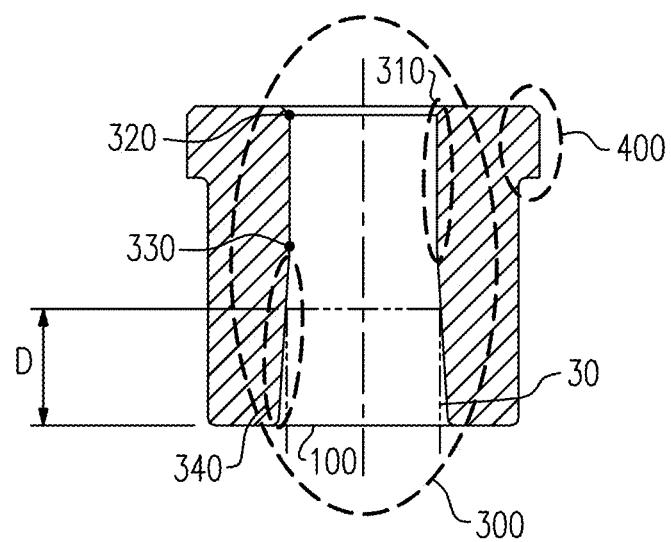
FIG. 2 is a vertical cross-sectional view of a sealed sleeve according to an exemplary embodiment of the present invention.
Figure 3:
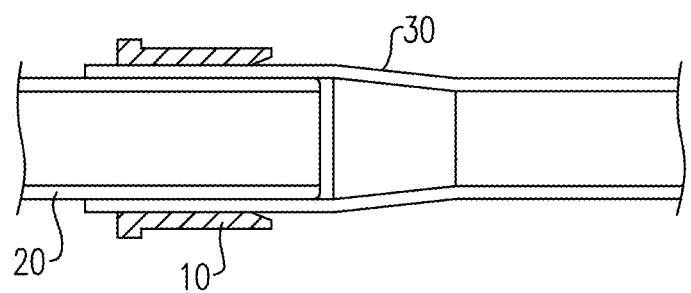
FIG. 3 is a cross-sectional view illustrating a state in which a sealed sleeve insertion couples and seals two pipes whose outer diameter and inner diameter are different according to an exemplary embodiment of the present invention.
Figure 4:
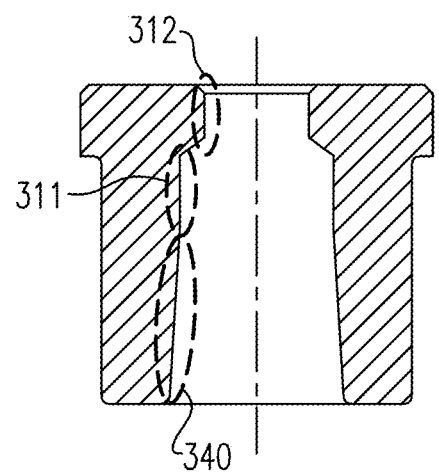
FIG. 4 is a vertical cross-sectional view of a state in which a pressing portion of a sealed sleeve has a front end pressing portion and a rear end pressing portion according to an exemplary embodiment of the present invention.
Figure 5:
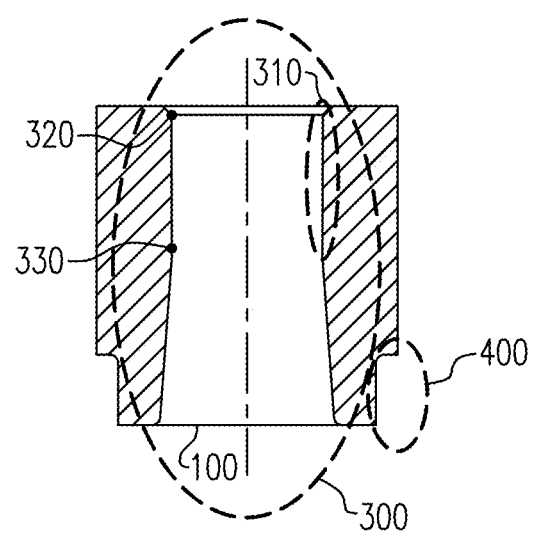
FIG. 5 is a cross-sectional view illustrating an identification structure of a sealed sleeve formed by engraving according to an exemplary embodiment of the present invention.

An exemplary embodiment of the present invention is as follows.

There is provided a sealed sleeve installed at an insertion coupling portion in a state in which a first pipe and a second pipe are insertion coupled to each other in order to seal couple the first pipe having a first outer diameter and a first inner diameter and the second pipe having a second outer diameter and a second inner diameter larger than the first outer diameter, the sealed sleeve including:

a pillar shaped-main body having a main body central shaft;

a through-hole formed using the main body central shaft as a central shaft on the main body and having an inlet as a second pipe side opening in an installation state and an outlet as a first pipe side opening in an installation state, wherein the through-hole has a pressing portion formed an inner wall from a pressing portion second boundary portion positioned at a corner of the outlet to a pressing portion first boundary portion existing at a predetermined position within the through-hole to apply a sealing pressure to the insertion coupling portion, an inner diameter of the pressing portion is smaller than the second outer diameter and is equally formed at an entire point from the pressing portion second boundary portion to the pressing portion first boundary portion, the through-hole has a pressing introducing portion whose inner diameter gradually decreases over an area from the inlet to the pressing portion first boundary portion in order to gradually increase a pressure in which the sealed sleeve applies to the second pipe as the sealed sleeve is gradually inserted into the second pipe side in a mounting process of the sealed sleeve, an inner wall of the through-hole forming the pressing introducing portion is formed in a curved surface, and a sectional outer edge line of the pressing introducing portion by a flat surface including the main body central shaft becomes a convex-shaped arc having a predetermined curvature radius.

MODE FOR INVENTION

Hereinafter, the present invention will be described in detail with reference to the attached drawings. As those skilled in the art would realize, the described embodiments may be modified in various different ways, all without departing from the spirit or scope of the present invention, the drawings and description are to be regarded as illustrative in nature and not restrictive. Like reference numerals designate like elements throughout the specification.

Throughout this specification and the claims that follow, when it is described that an element is "connected (accessed, contact, and coupled)" to another element, the element may be "directly connected" to the other element and "indirectly connected" to the other element through a third element. In addition, unless explicitly described to the contrary, the word "comprise" and variations such as "comprises" or "comprising", will be understood to imply the inclusion of stated elements but not the exclusion of any other elements.

Terms used in the present application are used for describing a specific exemplary embodiment and do not limit the present invention. When using in a description of the present disclosure and the appended claims, a singular form includes a plurality of forms unless it is explicitly differently represented. Further, in this specification, a term "comprise" or "have" indicates presence of a characteristic, numeral, step, operation, element, component, or combination thereof described in the specification and does not exclude presence or addition of at least one other characteristic, numeral, step, operation, element, component, or combination thereof.

Hereinafter, exemplary embodiments according to the present invention will be described in detail with reference to the attached drawings.

In order to seal couple a first pipe having a first outer diameter and a first inner diameter and a second pipe having a second outer diameter and a second inner diameter larger than the first outer diameter, in a state in which the first pipe and the second pipe are insertion coupled to each other, a sealed sleeve of the present invention has a shape to be installed in an insertion coupling portion. The insertion coupling portion represents a portion in which the first pipe and the second pipe contact by coupling and an adjacent area.

The sealed sleeve includes a pillar shaped-main body having a main body central shaft and a through-hole formed using the main body central shaft as a central shaft on a main body and having an inlet as an opening of the second pipe side in an installation state and an outlet as an opening of the first pipe side in an installation state. The main body may have a pillar shape as a sufficient shape and include pillars having various cross-sections as well as a cylinder, a hexagonal pillar, a quadrangular pillar.

Further, in the through-hole, a pressing portion that applies a sealing pressure to the insertion coupling portion is formed on a portion of the inner wall.

An inner diameter of the pressing portion is selected to be smaller than the second outer diameter. It is preferable that the pressing portion inner diameter is selected to be larger than the first outer diameter, and this is related to an installation process of the sealed sleeve, and in more detail, this is related to a method of first inserting the sealed sleeve into the first pipe and coupling the first pipe and the second pipe, and pushing and installing the sealed sleeve in an insertion coupling portion direction.

It is characterized in that the pressing portion is formed adjacent to an outlet. In a process of pushing and installing the sealed sleeve in an insertion coupling portion direction, in consideration that the inlet first enters an insertion coupling portion and the outlet finally enters the insertion coupling portion, when the pressing portion is formed at a portion adjacent to the outlet, a sealing function of the sealed sleeve may be maximized.

Further, it is preferable that an inner diameter of the pressing portion is equally formed at an entire point from a pressing portion second boundary portion positioned at a corner of the outlet to a pressing portion first boundary portion existing at a predetermined position within the through-hole. In general, in consideration that outer diameters of the first pipe and the second pipe are equally applied at an entire point, when the pressing portion is formed to be inclined, this is because sealability cannot be formed over a wide area. The pressing portion second boundary portion and the pressing portion first boundary portion are set along an inner wall of the through-hole.

A main body central shaft direction length (pressing portion length) of the pressing portion is defined to a length from the pressing portion second boundary portion to the pressing portion first boundary portion, and it is preferable that the pressing portion length is formed in a length having a value of 20 to 40% of the central shaft direction length (main body length) of the main body. When the pressing portion length is less than 20% of the main body length, in a use process, seal is broken and thus leakage occurs, and when the pressing portion length exceeds 40% of the main body length, resultantly a length of a pressing introducing portion to be described later is shortened, an impact force applied to the pressing introducing portion increases and thus it should be noted that the sealed sleeve may be broken.

Hereinafter, Exemplary Embodiments and Experimental Examples are described.

Exemplary Embodiment 1

A first pipe having a first outer diameter and a first inner diameter and a second pipe having a second outer diameter and a second inner diameter larger than the first outer diameter were prepared, and by forming a length of a pressing portion by 20% of a length (10 mm) of a central shaft direction of a main body, a sealed sleeve was produced, and by connecting the sealed sleeve to the first pipe and by inserting the first pipe into the second pipe, insertion coupling and sealing of the first pipe and the second pipe was prepared.

Exemplary Embodiment 2

Insertion coupling and sealing of a sealed sleeve, a first pipe, and a second pipe was prepared with the same method as that of Exemplary Embodiment 1 except that a length of a pressing portion is formed by 30% of a length of a central shaft direction of a main body.

Exemplary Embodiment 3

Insertion coupling and sealing of a sealed sleeve, a first pipe, and a second pipe was prepared with the same method as that of Exemplary Embodiment 1 except that a length of a pressing portion is formed by 40% of a length of a central shaft direction of a main body.

Comparative Example 1

Insertion coupling and sealing of a sealed sleeve, a first pipe, and a second pipe was prepared with the same method as that of Exemplary Embodiment 1 except that a length of a pressing portion is formed by 15% of a length of a central shaft direction of a main body.

Comparative Example 2

Insertion coupling and sealing of a sealed sleeve, a first pipe, and a second pipe was prepared with the same method as that of Exemplary Embodiment 1 except that a length of a pressing portion is formed by 45% of a length of a central shaft direction of a main body.

Experimental Example 1

In a state in which the sealed sleeve, the first pipe, and the second pipe (second outer diameter: 5.6 mm) of Exemplary Embodiment 1, Exemplary Embodiment 2, Exemplary Embodiment 3, Comparative Example 1, and Comparative Example 2 are connected, the sealed sleeve, the first pipe, and the second pipe were insertion coupled and sealed using a hydraulic pressure jig, while supplying and using a refrigerant (under a supply pressure of a normal refrigerant using for a vehicle, an air-conditioner, and a refrigerator) to the pipe after sealing, a state of the sealed sleeve was determined. A result thereof was represented in Table 1.

TABLE 1

| | Sealing state |
|---|---|
| Exemplary Embodiment 1 (20%) | OK |
| Exemplary Embodiment 2 (30%) | OK |
| Exemplary Embodiment 3 (40%) | OK |
| Comparative Example 1 (15%) | Leakage has occurred |
| Comparative Example 2 (45%) | Break has occurred |

Referring to a result of Table 1, it was determined that a phenomenon does not occur that the first pipe and the second pipe sealed by the sealed sleeve of Exemplary Embodiments 1 to 3 of the present invention is torn or that a phenomenon does not occur that a fluid is leaked. However, in Comparative Example 1, a phenomenon has occurred that a fluid is leaked, and in Comparative Example 2, in a sealing process, a sectional break phenomenon of the sealed sleeve has occurred.

In a mounting process of the sealed sleeve, as the sealed sleeve is gradually further inserted to the second pipe side, in order to gradually increase a pressure in which the sealed sleeve applies to the second pipe, the pressing introducing portion is provided in the through-hole, an inner diameter of the through-hole gradually decreases over an area from the inlet to the pressing portion first boundary portion. Through such a configuration, in the pressing introducing portion, because the second pipe may gradually change a pressure that applies to a main body of the sealed sleeve from an installation initial stage to a time point in which the second pipe end portion arrives at the pressing portion, in an installation process, the second pipe and the sealed sleeve collide and thus an impact force may be prevented from largely occurring.

A trend (grade) that gradually decreases in this way may be set in proportion to (first function) a main body central shaft direction length, but preferably, an inner wall of the through-hole forming the pressing introducing portion may be formed in a curved surface.

Further, a sectional outer edge line of the pressing introducing portion by a flat surface including the main body central shaft may be a convex-shaped arc having a predetermined curvature radius. Through such a configuration, at an installation initial stage (a pressure is small in which the sealed sleeve applies to the second pipe), an increase portion of a pressure may increase when the sealed sleeve moves in a main body central shaft direction, and at an installation latter stage (a state in which a pressure has been already increased in which the sealed sleeve applies to the second pipe), an increase portion of a pressure may relatively decrease when the sealed sleeve continuously moves in a main body central shaft direction. Thereby, a failure of cross-section break of the sealed sleeve can be minimized. Further, a sectional outer edge line of the pressing introducing portion by a flat surface including the main body central shaft may be designed in a spline of a convex shape.

However, when forming a sectional outer edge line of the pressing introducing portion by a flat surface including the main body central shaft in a concave-shaped arc, it was determined that such a configuration may cause cross-section break of the sealed sleeve (inferiority rate 10%). In such a phenomenon, after a middle stage of an installation process (in a state in which a pressure between the second pipe and the sealed sleeve has been already raised), this is because a pressure change becomes large and thus an impact force in which the sealed sleeve receives cannot but increase.

When forming a sectional outer edge line of the pressing introducing portion by a flat surface including the main body central shaft in a taper configuration of a straight line, an inferiority rate of the sealed sleeve was low (5%) rather than when forming a sectional outer edge line of the pressing introducing portion by a flat surface including the main body central shaft in the foregoing concave-shaped arc, but it may be determined that an inferiority rate is high rather than when forming a sectional outer edge line of the pressing introducing portion by a flat surface including the main body central shaft in a convex-shaped arc.

In this case, a curvature radius of an arc may be determined according to a length of the pressing introducing portion and an introducing contact depth or introducing depth D (a distance from a position in which the inner wall of the pressing introducing portion and the second pipe first contact (a state in which a pressure does not yet occur) to the inlet) and a semi-diameter direction distance (pressure step, the difference between the second outer diameter and the pressing portion inner diameter) from an introducing contact depth D to a pressing portion first boundary portion.

When a length of the pressing introducing portion increases, a curvature decreases (a curvature radius increases).

When an introducing depth D increases, a curvature increases (a curvature radius decreases) in consideration of a second pipe of the same size.

When a pressure step increases, a curvature increases (a curvature radius decreases) in consideration of a second pipe of the same size.

Further, a length of the pressing introducing portion, an introducing depth D, and a pressure step become a factor that determines an entire size (length and width) of the sealed sleeve of the present invention.

In the present invention, an outer edge line curvature of a cross-section by a flat surface including a main body central shaft of the pressing introducing portion is not limited to a specific one, and this is because such a curvature may be changed according to an entire size of the sealed sleeve.

An inner diameter of the inlet is related to the introducing depth D, and when an inner diameter of the inlet increases, the introducing depth D increases.

A pressure step (a difference between the pressing portion inner diameter and the second outer diameter) is a most important factor that determines a force in which the sealed sleeve of the present invention operates in the seal coupler. The pressure step may be set to be 5 to 15% of the second outer diameter. When the pressure step is so large, the pressing introducing portion should be extended and thus an external form of the sealed sleeve unnecessarily increases, and when the pressure step decreases, a problem occurs that a sealing pressure decreases.

Hereinafter, Exemplary Embodiments and Experimental Examples are described.

Exemplary Embodiment 4

A first pipe having a first outer diameter and a first inner diameter and a second pipe having a second outer diameter and a second inner diameter larger than the first outer diameter were prepared, a length of a pressing portion was formed by 30% of a length of a central shaft direction of a main body, a sealed sleeve in which a pressure step becomes 5% of the second outer diameter was produced, the sealed sleeve was connected to the first pipe, the first pipe was inserted into the second pipe, and insertion coupling and sealing of the first pipe and the second pipe was prepared.

Exemplary Embodiment 5

Insertion coupling and sealing of a sealed sleeve, a first pipe, and a second pipe was prepared with the same method as that of Exemplary Embodiment 4 except that a pressure step is formed by 10% of the second outer diameter.

Exemplary Embodiment 6

Insertion coupling and sealing of a sealed sleeve, a first pipe, and a second pipe was prepared with the same method as that of Exemplary Embodiment 4 except that a pressure step is formed by 15% of the second outer diameter.

Comparative Example 3

Insertion coupling and sealing of a sealed sleeve, a first pipe, and a second pipe was prepared with the same method as that of Exemplary Embodiment 1 except that a length of a pressing portion is formed by 3% of a length of a central shaft direction of a main body.

Comparative Example 4

Insertion coupling and sealing of a sealed sleeve, a first pipe, and a second pipe was prepared with the same method as that of Exemplary Embodiment 1 except that a length of a pressing portion is formed by 20% of a length of a central shaft direction of a main body.

Experimental Example 2

In a state in which the sealed sleeve, the first pipe and the second pipe of Exemplary Embodiment 4, Exemplary Embodiment 5, Exemplary Embodiment 6, Comparative Example 3, and Comparative Example 4 are connected, the sealed sleeve, the first pipe, and the second pipe were insertion coupled and sealed using a hydraulic pressure jig, after sealing them, while supplying and using a refrigerant to the pipe, a state of the sealed sleeve was determined. A result thereof was represented in Table 2.

TABLE 2

| | Sealing state |
|---|---|
| Exemplary Embodiment 4 (5%) | OK |
| Exemplary Embodiment 5 (10%) | OK |
| Exemplary Embodiment 6 (15%) | OK |
| Comparative Example 3 (3%) | Leakage has occurred |
| Comparative Example 4 (20%) | Break has occurred |

Referring to Table 2, it was determined that a phenomenon does not occur that the first pipe and the second pipe sealed by a sealed sleeve of Exemplary Embodiments 4 to 6 of the present invention are torn or that a phenomenon does not occur that a refrigerant fluid is leaked. However, in Comparative Example 3, a phenomenon has occurred that a fluid is leaked, and in Comparative Example 4, in a sealing process, a sectional break phenomenon of the sealed sleeve has occurred.

The pressing portion includes a front end pressing portion and a rear end pressing portion (it is defined that the front end pressing portion is adjacent to the inlet further than the rear end pressing portion), an inner diameter of the front end pressing portion may be formed larger than an inner diameter of the rear end pressing portion. Further, it is preferable that both the rear end pressing portion and the front end pressing portion are formed in a flat shape. In this way, when the pressing portion formed with the front end pressing portion and the rear end pressing portion is provided in the sealed sleeve, in an installation process, if an end portion of the second pipe enters the rear end pressing portion via the front end pressing portion, a contact of an outer surface of the second pipe and the front end pressing portion is not released, and this is because the second pipe has a small outer diameter in the rear end pressing portion rather than the front end pressing portion due to plastic deformation, and resultantly the second pipe maintains an entire contact with each of the front end pressing portion and the rear end pressing portion.

In consideration of this, it may be considered that a difference between the front end pressing portion inner diameter and the rear end pressing portion inner diameter is set to 1 to 10% of the rear end pressing portion inner diameter. When the difference between the front end pressing portion inner diameter and the rear end pressing portion inner diameter is larger than 10% of the rear end pressing portion inner diameter, a possibility increases that a contact of an outer surface of the second pipe and the front end pressing portion may be released or in an installation process, an impact amount applied to the sealed sleeve increases, when the difference between the front end pressing portion inner diameter and the rear end pressing portion inner diameter is smaller than 1% of the rear end pressing portion inner diameter, there is no practical benefit in a pressing portion structure of a two-stage configuration.

A main body according to an exemplary embodiment of the present invention may have an identification structure having a function of enabling to identify a direction of an inlet and an outlet by tactile sense. A worker can easily recognize a direction of the sealed sleeve by a naked hand or a hand with a glove worn through an identification structure.

The identification structure may be formed in an embossing structure relatively protruded from an outer surface of a main body or an engraving structure relatively recessed from an outer surface of a main body, and the embossing structure or the engraving structure may have a step of 0.2 to 2 mm from the outer surface of the main body. When a step of the identification structure from the outer surface of the main body is smaller than 0.2 mm, in a situation in which a worker works with a glove worn, identification is difficult, and when a step of the identification structure from the outer surface of the main body is larger than 2 mm, it is disadvantageous in a cost price. Further, a lengthwise direction length of the identification structure is not determined.

The identification structure may be installed at any side of the inlet or the outlet, but it is preferable that the identification structure is biasedly installed at any side of the inlet or the outlet. Further, it is unnecessary that an end portion of the identification structure corresponds with an end portion surface of the inlet or outlet side.

Hereinafter, a method of using a sealed sleeve according to an exemplary embodiment of the present invention will be described.

First, the sealed sleeve is inserted into the first pipe such that the inlet is adjacent to the insertion coupling portion. Second, the first pipe is insertion coupled to a second pipe with the sealed sleeve inserted. Third, an end portion of the second pipe is inserted into the inlet side of the sealed sleeve. Fourth, by applying a pressure to an end portion of the outlet side of the sealed sleeve, the second pipe is inserted along a curved surface of the pressing introducing portion and thus an end portion of the second pipe arrives at a pressing portion first boundary portion. Fifth, by applying a pressure to an end portion of the outlet side of the sealed sleeve, the second pipe end portion arrives at the pressing portion second boundary portion. Sixth, as the pressing portion applies a sealing pressure to an insertion coupling portion, sealing connection of the first pipe and the second pipe is complete. The present invention is not limited to an example of such a use method.

The foregoing description of the present invention is an illustration, and it may be understood by a person of ordinary skill in the art that the present invention may be easily changed in different detailed forms without changing the technical spirit or an essential characteristic of the present invention. Therefore, it should be understood that the foregoing exemplary embodiments are not limited but are illustrative. For example, each constituent element described in a single type may be distributedly performed, and constituent elements described in a distributed type may be performed in a combined form.

The scope of the present invention is represented by claims to be described later, and it should be analyzed that a meaning and the scope of claims and an entire change or a changed form derived from an equivalent concept thereof are included in the scope of the present invention.

DESCRIPTION OF SYMBOLS

10: sealed sleeve
20: first pipe
30: second pipe
100: inlet
200: outlet
300: through-hole
310: pressing portion
311: front end pressing portion
312: rear end pressing portion
320: pressing portion first boundary portion
330: pressing portion second boundary portion
340: pressing introducing portion
400: identification structure

What is claimed is:

1. A sealed sleeve installed at an insertion coupling portion in a state in which a first pipe and a second pipe are insertion coupled to each other in order to seal couple the first pipe having a first outer diameter and a first inner diameter and the second pipe having a second outer diameter and a second inner diameter larger than the first outer diameter, the sealed sleeve comprising:
a pillar-shaped main body having a main body central shaft; and
a through-hole formed through the main body central shaft and having an inlet as a second pipe side opening in an installation state and an outlet as a first pipe side opening in the installation state,
wherein the through-hole comprises:
a pressing portion adapted to hermetically press the insertion coupling portion, wherein the pressing portion extends from a first boundary portion positioned at an outer edge of the outlet to a second boundary portion adjoining the pressing portion, and
a pressing introducing portion extending from the inlet to the second boundary portion,
wherein the pressing portion has a constant inner diameter which is larger than the first outer diameter of the first pipe and smaller than the second outer diameter of the second pipe in prior to the state in which the sealed sleeve is installed,
wherein the sealed sleeve is formed to couple the first pipe and the second pipe after the sealed sleeve is inserted over the first pipe,
wherein the secondary boundary portion is a boundary line directly dividing the pressing portion and the pressing introducing portion such that the pressing portion and the pressing introducing portion are directly adjacent to the second boundary portion,
wherein the pressing introducing portion has a curved surface at its inner wall and an inner diameter that gradually decreases from the inlet towards the second boundary portion,
wherein in a cross-sectional view of the main body central shaft, an outer edge of the pressing introducing portion forms a convex-shaped arc having a predetermined curvature radius, and
wherein a minimum of the inner diameter of the pressing introducing portion is same as the constant inner diameter of the pressing portion.

2. The sealed sleeve of claim 1, further comprising a front end pressing portion between the pressing portion and the pressing introducing portion, wherein an inner diameter of the front end pressing portion is larger than the constant inner diameter of the pressing portion.

3. The sealed sleeve of claim 2, wherein a difference between the inner diameter of the front end pressing portion and the inner diameter of the pressing portion is 1% to 10% of the inner diameter of the pressing portion.

4. The sealed sleeve of claim 2, wherein the inner diameter of the front end pressing portion between the pressing portion and the pressing introducing portion is constant.

5. The sealed sleeve of claim 1, wherein the main body has an identification structure for distinguishing the inlet from the outlet by tactile sense.

6. The sealed sleeve of claim 5, wherein the identification structure comprises an embossing structure that protrudes from a main body outer surface or an engraving structure that is depressed from the main body outer surface.

7. The sealed sleeve of claim 6, wherein the embossing structure or the engraving structure has a step of 0.2 mm to 2 mm from the main body outer surface.

8. The sealed sleeve of claim 5, wherein the identification structure comprises an embossing structure that protrudes from the main body outer surface that is adjacent the outlet.

9. The sealed sleeve of claim 5, wherein the identification structure comprises an engraving structure that is depressed from the main body outer surface that is adjacent the inlet.

10. The sealed sleeve of claim 1, wherein a difference between an inner diameter of the pressing portion and the second outer diameter is 5% to 15% of the second outer diameter.

11. The sealed sleeve of claim 1, wherein the predetermined curvature radius is determined according to a length of the pressing introducing portion, an introducing contact depth, and a pressure step.

12. A sealed sleeve installed at an insertion coupling portion in a state in which a first pipe and a second pipe are insertion coupled to each other in order to seal couple the first pipe having a first outer diameter and a first inner diameter and the second pipe having a second outer diameter and a second inner diameter larger than the first outer diameter, the sealed sleeve comprising:
- a pillar-shaped main body having a main body central shaft; and
- a through-hole formed through the main body central shaft and having an inlet as a second pipe side opening in an installation state and an outlet as a first pipe side opening in the installation state, wherein the through-hole comprises:
- a pressing portion adapted to hermetically press the insertion coupling portion, wherein the pressing portion extends from a first boundary portion positioned at an outer edge of the outlet to a second boundary portion adjoining the pressing portion, and
- a pressing introducing portion extending from the inlet to the second boundary portion, wherein the pressing portion has a constant inner diameter which is larger than the first outer diameter of the first pipe and smaller than the second outer diameter of the second pipe in prior to the state in which the sealed sleeve is installed, wherein the sealed sleeve is formed to couple the first pipe and the second pipe after the sealed sleeve is inserted over the first pipe, wherein the secondary boundary portion is a boundary line directly dividing the pressing portion and the pressing introducing portion such that the pressing portion and the pressing introducing portion are directly adjacent to the second boundary portion, wherein the pressing introducing portion has a curved surface at its inner wall and an inner diameter that gradually decreases from the inlet towards the second boundary portion, wherein in a cross-sectional view of the main body central shaft, an outer edge of the pressing introducing portion forms a convex-shaped arc having a predetermined curvature radius, and wherein the predetermined curvature radius is determined according to a length of the pressing introducing portion, an introducing contact depth, and a pressure step.

13. The sealed sleeve of claim 12, wherein a minimum of the inner diameter of the pressing introducing portion is same as the constant inner diameter of the pressing portion.

14. The sealed sleeve of claim 12, further comprising a front end pressing portion between the pressing portion and the pressing introducing portion, wherein an inner diameter of the front end pressing portion is larger than the constant inner diameter of the pressing portion.

15. The sealed sleeve of claim 14, wherein the main body has an identification structure for distinguishing the inlet from the outlet by tactile sense.

16. The sealed sleeve of claim 15, wherein the identification structure comprises an embossing structure that protrudes from a main body outer surface or an engraving structure that is depressed from the main body outer surface.

17. The sealed sleeve of claim 16, wherein the embossing structure or the engraving structure has a step of 0.2 mm to 2 mm from the main body outer surface.

18. The sealed sleeve of claim 15, wherein the identification structure comprises an embossing structure that protrudes from the main body outer surface that is adjacent the outlet.

19. The sealed sleeve of claim 15, wherein the identification structure comprises an engraving structure that is depressed from the main body outer surface that is adjacent the inlet.

20. The sealed sleeve of claim 14, wherein a difference between the inner diameter of the front end pressing portion and the inner diameter of the pressing portion is 1% to 10% of the inner diameter of the pressing portion.

21. The sealed sleeve of claim 14, wherein the inner diameter of the front end pressing portion between the pressing portion and the pressing introducing portion is constant.

22. The sealed sleeve of claim 12, wherein a difference between an inner diameter of the pressing portion and the second outer diameter is 5% to 15% of the second outer diameter.

* * * * *